US009617777B2

(12) United States Patent
Aoshima et al.

(10) Patent No.: US 9,617,777 B2
(45) Date of Patent: Apr. 11, 2017

(54) VEHICLE WINDOW OPENING DEVICE

(71) Applicant: ASMO CO., LTD., Shizuoka-ken (JP)

(72) Inventors: Hiroki Aoshima, Iwata (JP); Keitaro Sato, Okazaki (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 15/009,257

(22) Filed: Jan. 28, 2016

(65) Prior Publication Data

US 2016/0222711 A1 Aug. 4, 2016

(30) Foreign Application Priority Data

Feb. 3, 2015 (JP) .................................. 2015019636
Feb. 10, 2015 (JP) .................................. 2015024225

(51) Int. Cl.
*G05B 5/00* (2006.01)
*E05F 15/695* (2015.01)
*E05F 15/41* (2015.01)

(52) U.S. Cl.
CPC ............ *E05F 15/695* (2015.01); *E05F 15/41* (2015.01); *E05Y 2900/55* (2013.01)

(58) Field of Classification Search
CPC .... E05F 15/44; E05F 15/443; E05Y 2900/55; H02H 7/0851
See application file for complete search history.

(56) References Cited

U.S. PATENT DOCUMENTS 5,218,282 A * 6/1993 Duhame .............. H02H 7/0851 318/434
6,906,482 B2 * 6/2005 Shimizu ............... H02H 7/0851 318/286
7,259,532 B2 * 8/2007 Shinohara ................. H02P 7/04 318/282
7,276,872 B2 * 10/2007 Nishimura .............. E05F 15/41 318/286
7,342,373 B2 * 3/2008 Newman ............ B60H 1/00735 318/280
7,362,068 B2 * 4/2008 Yamamoto ........... H02H 7/0851 318/266
7,701,157 B2 * 4/2010 Shimomura ....... G05B 19/0428 318/256

FOREIGN PATENT DOCUMENTS

JP 2011122369 A 6/2011
JP 5632157 B2 11/2014

* cited by examiner

*Primary Examiner* — Katherine Mitchell
*Assistant Examiner* — Abe Massad
(74) *Attorney, Agent, or Firm* — Patterson Thuente Pedersen, P.A.

(57) ABSTRACT

A vehicle window opening device includes a controlling portion, which controls opening/closing operation of a vehicle window based on drive force of a drive portion, a manipulation portion, which outputs a command signal in response to manipulation, and a catching detecting portion, which detects catching of a foreign object by the vehicle window based on a characteristic value of the drive portion that fluctuates in accordance with fluctuation in load acting on the vehicle window during an opening operation. The control portion is configured to control the opening operation, the closing operation, or both the opening and closing operations of the vehicle window based on manipulation of the manipulation portion after detection of catching by the catching detecting portion.

5 Claims, 4 Drawing Sheets

VEHICLE WINDOW OPENING DEVICE

BACKGROUND OF THE INVENTION

The present invention relates to a vehicle window opening device such as a vehicle-mounted power window device.

Conventionally, vehicle window opening devices have been known that have a function to detect a foreign object hampering an opening/closing operation of a vehicle window. For example, Japanese Laid-Open Patent Publication No. 2011-122369 discloses a vehicle window opening device (power window device) that detects the operation of a vehicle window being hampered by a foreign object based on changes in fluctuation of the rotational speed of a motor serving as a drive source. Based on the detection of such a foreign object, the vehicle window opening device stops the motor to reduce the load acting on the foreign object. Accordingly, it is possible to prevent a foreign object from being trapped between the vehicle window pane and the window frame during the closing operation. It is also possible to prevent a foreign object from being caught in the door during the opening operation.

However, in a vehicle window opening device equipped with such a foreign object detecting function, if a vehicle occupant erroneously manipulates the manipulation switch to open the window after a foreign object being caught is detected during the opening operation, the opening operation is re-started with the foreign object caught in the vehicle window. This may result in the foreign object being further deeply caught, becoming more difficult to remove.

Also, for example, some vehicle window opening devices allow manipulation switches provided at one seat, for example, the driver's seat, to control opening/closing of vehicle windows at distant seats. In this case, the state of the vehicle window at a distant seat cannot be easily determined from the driver's seat when a foreign matter is caught in that window. The occupant in the driver's seat thus may manipulate the switch to open the window, which would cause the foreign object to be further deeply caught.

SUMMARY OF THE INVENTION

Accordingly, it is an objective of the present invention to provide a vehicle window opening device that readily removes a caught foreign object and/or prevents an already caught foreign object from being further deeply caught.

To achieve the foregoing objective and in accordance with one aspect of the present invention, a vehicle window opening device is provided that includes a controlling portion, which controls opening/closing operation of a vehicle window based on drive force of a drive portion, a manipulation portion, which outputs a command signal in response to manipulation, and a catching detecting portion, which detects catching of a foreign object by the vehicle window based on a characteristic value of the drive portion that fluctuates in accordance with fluctuation in load acting on the vehicle window during an opening operation. The control portion is configured to control the opening operation, the closing operation, or both the opening and closing operations of the vehicle window based on manipulation of the manipulation portion after detection of catching by the catching detecting portion.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

A vehicle window opening device according to a first embodiment will now be described.

Figure 1:
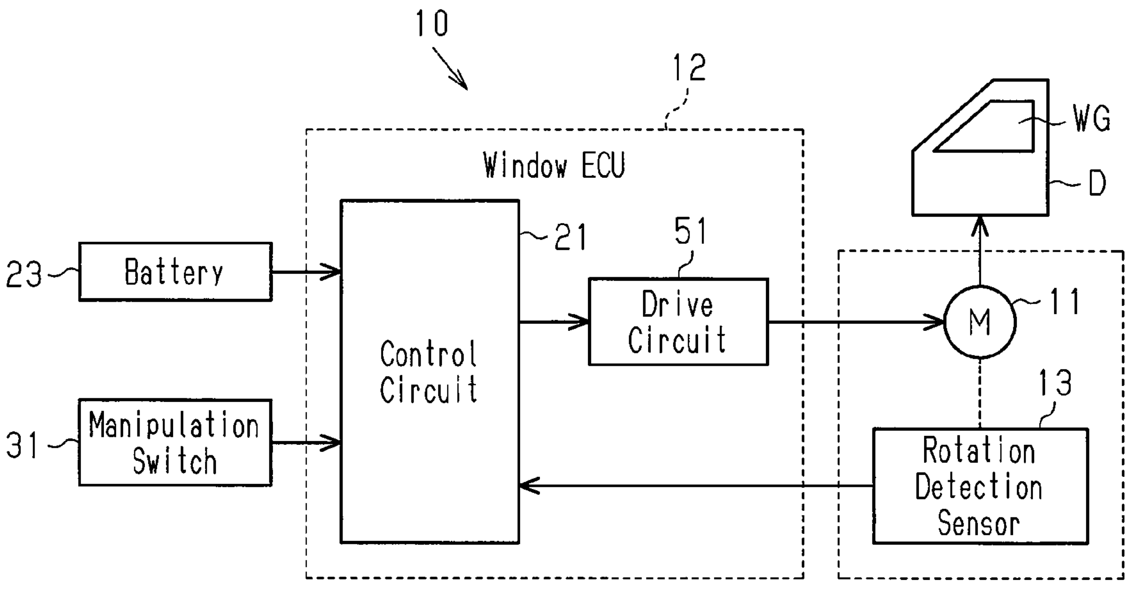
FIG. 1 is an electric block diagram schematically showing a power window device according to a first embodiment.

As shown in FIG. 1, a power window device 10 (vehicle window opening device) of the present embodiment is installed in a vehicle door D to control opening and closing of a window glass pane WG, which is a vehicle window of a vehicle. The power window device 10 includes a motor 11, which serves as a drive portion, and a scissor-type window regulator, which is driven by rotation of the motor 11 to open and close the window glass pane WG. The motor 11 is a geared motor unit that includes a DC motor and an integrated reducer. The window regulator converts rotation of the motor 11 into an opening/closing operation of the window glass pane WG.

The power window device 10 includes a window ECU 12, which controls the motor 11 to control operation of the window glass pane WG, and a rotation detection sensor 13, which detects rotation of the motor 11. The rotation detection sensor 13 is constituted, for example, by a Hall effect IC and detects changes in the magnetic field generated by rotation of a sensor magnet (not shown) attached to the rotary shaft of the motor 11, thereby detecting rotation information of the motor 11, such as the number of rotations and the rotational position.

The window ECU 12 is either provided separately from the motor 11 or integrally incorporated in the motor 11. The window ECU 12 includes a control circuit 21 and a drive circuit 51. The drive circuit 51 supplies power from a vehicle battery 23 to the motor 11 based on control by the control circuit 21.

Based on manipulation of a manipulation switch 31, which functions as a manipulation portion provided in the vehicle door D, the control circuit 21, which functions as a controlling portion, causes the motor 11 to rotate via the drive circuit 51, thereby opening or closing the window glass pane WG. Based on a rotation detection signal (a pulse signal) output by the rotation detection sensor 13, the control circuit 21 calculates positional information of the window glass pane WG. In the present embodiment, with the fully closed position of the window glass pane WG defined as a reference (zero), the control circuit 21 calculates, as the positional information of the window glass pane WG, the number of counts of pulse edges (rising edges and falling edges) in the rotation detection signal. The number of counts is increased or decreased in accordance with the opening/closing operation of the window glass pane WG (that is, forward/reverse rotation of the motor 11). Also, the control circuit 21 detects the rotational direction of the motor 11 based on the rotation detection signal. Further, based on the interval (cycle) of the pulses of the rotation detection signal, the control circuit 21 calculates the rotational speed of the motor 11 and the fluctuation of the speed of the motor 11 (speed fluctuation).

The control circuit 21 receives various types of command signals from the manipulation switch 31 to open (lower) or close (raise) the window glass pane WG. The manipulation switch 31 is manipulated to open or close the window glass pane WG in a range from the fully closed position to the fully open position. The manipulation switch 31 is constituted by a rocker switch that can be manipulated in two stages and includes an opening switch, a closing switch, and an auto switch.

Specifically, when the manipulation switch 31 is manipulated to the first stage on the first side, the opening switch is turned on. In this state, the manipulation switch 31 outputs, to the control circuit 21, a manual opening command signal for performing a manual opening of the window glass pane WG, that is, for causing the window glass pane WG to open while the manipulation switch 31 is manipulated. Also, when the manipulation switch 31 is manipulated to the first stage on the second side, the closing switch is turned on. In this state, the manipulation switch 31 outputs, to the control circuit 21, a manual closing command signal for performing a manual closing of the window glass pane WG, that is, for causing the window glass pane WG to close while the manipulation switch 31 is manipulated.

When the manipulation switch 31 is manipulated to the second stage on the first side (auto opening manipulation), the opening switch and the auto switch are both turned on. In this state, the manipulation switch 31 outputs, to the control circuit 21, an auto opening command signal for performing an auto opening of the window glass pane WG, that is, for causing the window glass pane WG to open until it reaches the fully open position even if the manipulation switch 31 is released. Also, when the manipulation switch 31 is manipulated to the second stage on the second side (auto closing manipulation), the closing switch and the auto switch are both turned on. In this state, the manipulation switch 31 outputs, to the control circuit 21, an auto closing command signal for performing an auto closing of the window glass pane WG, that is, for causing the window glass pane WG to close until it reaches the fully closed position even if the manipulation switch 31 is released.

When receiving the manual opening command signal or the manual closing command signal from the manipulation switch 31, the control circuit 21 drives the motor 11 to cause the window glass pane WG to perform the manual opening operation or the manual closing operation while the command signal is input (while the manipulation switch 31 is manipulated). Also, when receiving the auto opening command signal or the auto closing command signal from the manipulation switch 31, the control circuit 21 drives the motor 11 to cause the window glass pane WG to perform the auto operation until it reaches the fully open position or the fully closed position.

The control circuit 21 has a function to prevent a foreign object from being trapped between the window glass pane WG and the frame of the vehicle door D. Specifically, during the closing operation (rising operation) of the window glass pane WG, the control circuit 21 compares the speed fluctuation of the motor 11, which is obtained based on the rotation detection signal, with a trapping determination threshold value. If the speed fluctuation is greater than or equal to the trapping determination threshold value, the control circuit 21 determines that the window glass pane WG has trapped a foreign object. Based on that determination, the control circuit 21 reverses the window glass pane WG and moves it by a predetermined distance, so that the trapped foreign object can be released.

The control circuit 21 also has a function to detect catching of a foreign object in the vehicle door D during the opening operation (lowering operation). Specifically, during the opening operation of the window glass pane WG, the control circuit 21 as a catching detecting portion compares the speed fluctuation of the motor 11, which is obtained based on the rotation detection signal, with a catching determination threshold value. If the speed fluctuation is greater than or equal to the catching determination threshold value, the control circuit 21 determines that the window glass pane WG has caught a foreign object. Based on that determination, the control circuit 21 stops the motor 11, thereby stopping the opening operation of the window glass pane WG.

Based on the catching determination, the control circuit 21 prohibits the opening operation of the window glass pane WG, disables the trapping prevention function, and prohibits the auto closing operation of the window glass pane WG.

Specifically, when determining that catching has occurred, the control circuit 21 shifts to a mode for prohibiting the opening operation of the window glass pane WG. In the opening operation prohibiting mode, the control circuit 21 does not drive the motor 11 even when receiving the manual opening command signal or the auto opening command signal from the manipulation switch 31. That is, even if the manipulation switch 31 is manipulated to open the window glass pane WG, the opening operation of the window glass pane WG is not performed.

Also, when determining that there is catching of a foreign object, the control circuit 21 disables the trapping determination in the subsequent closing operation. That is, even if the speed fluctuation of the motor 11 becomes greater than or equal to the trapping determination threshold value during the closing operation, the control circuit 21 does not reverse the window glass pane WG to the opening direction. Accordingly, even if the caught foreign object causes the load to fluctuate, the window glass pane WG is not reversed.

When determining that there is catching of a foreign object, the control circuit 21 invalidates the auto closing command signal from the manipulation switch 31 (specifically, the auto closing command signal is regarded as the manual closing command signal). That is, at this time, even if the manipulation switch 31 is manipulated to activate the auto closing of the window glass pane WG, the auto closing operation of the window glass pane WG is not performed. However, even if the catching determination is made, the manual closing operation is permitted.

Thereafter, the control circuit 21, which serves as the controlling portion, permits the opening operation of the window glass pane WG based on the number of times n of the closing operation of the window glass pane WG, the operation time t of the closing operation, the displacement p of the closing operation after the determination of catching (that is, the control circuit 21 returns to the normal operation mode from the opening operation prohibiting mode), enables the trapping prevention function, and permits the auto closing operation of the window glass pane WG.

Specifically, when the number of times n of the closing operation of the window glass pane WG after the determination of catching becomes greater than or equal to a threshold value ns, the control circuit 21 permits the opening operation of the window glass pane WG, enables the trapping prevention function, and permits the auto closing operation.

Also, when the operation time t (accumulated operation time) of the closing operation of the window glass pane WG after the determination of catching becomes greater than or equal to a threshold value ts, the control circuit 21 permits the opening operation of the window glass pane WG, enables the trapping prevention function, and permits the auto closing operation. The threshold value ts is preferably set to a time (for example, 1 second) that corresponds to 50 mm of the actual displacement of the window glass pane WG in the closing operation.

Further, when the displacement p in the closing direction from the stop position, at which the window glass pane WG was stopped based on the determination of catching (in the present embodiment, the displacement p is represented by the number of counts of pulse edges in the rotation detection signal), becomes greater than or equal to a threshold value ps, the control circuit 21 permits the opening operation of the window glass pane WG, enables the trapping prevention function, and permits the auto closing operation. The threshold value ps is preferably set to a number of counts of pulse edges in the rotation detection signal that corresponds to 50 mm of the actual displacement of the window glass pane WG in the closing operation.

After determining that there is catching of a foreign object, the control circuit 21 determines whether the window glass pane WG is at the fully closed position (or in a predetermined fully closed region that includes the fully closed position). If the window glass pane WG is at the fully closed position (or in the fully closed region), the control circuit 21 permits the opening operation of the window glass pane WG, enables the trapping prevention function, and permits the auto closing operation.

Next, operation of the control performed when catching of a foreign object is detected in the present embodiment will be described.

Figure 2:
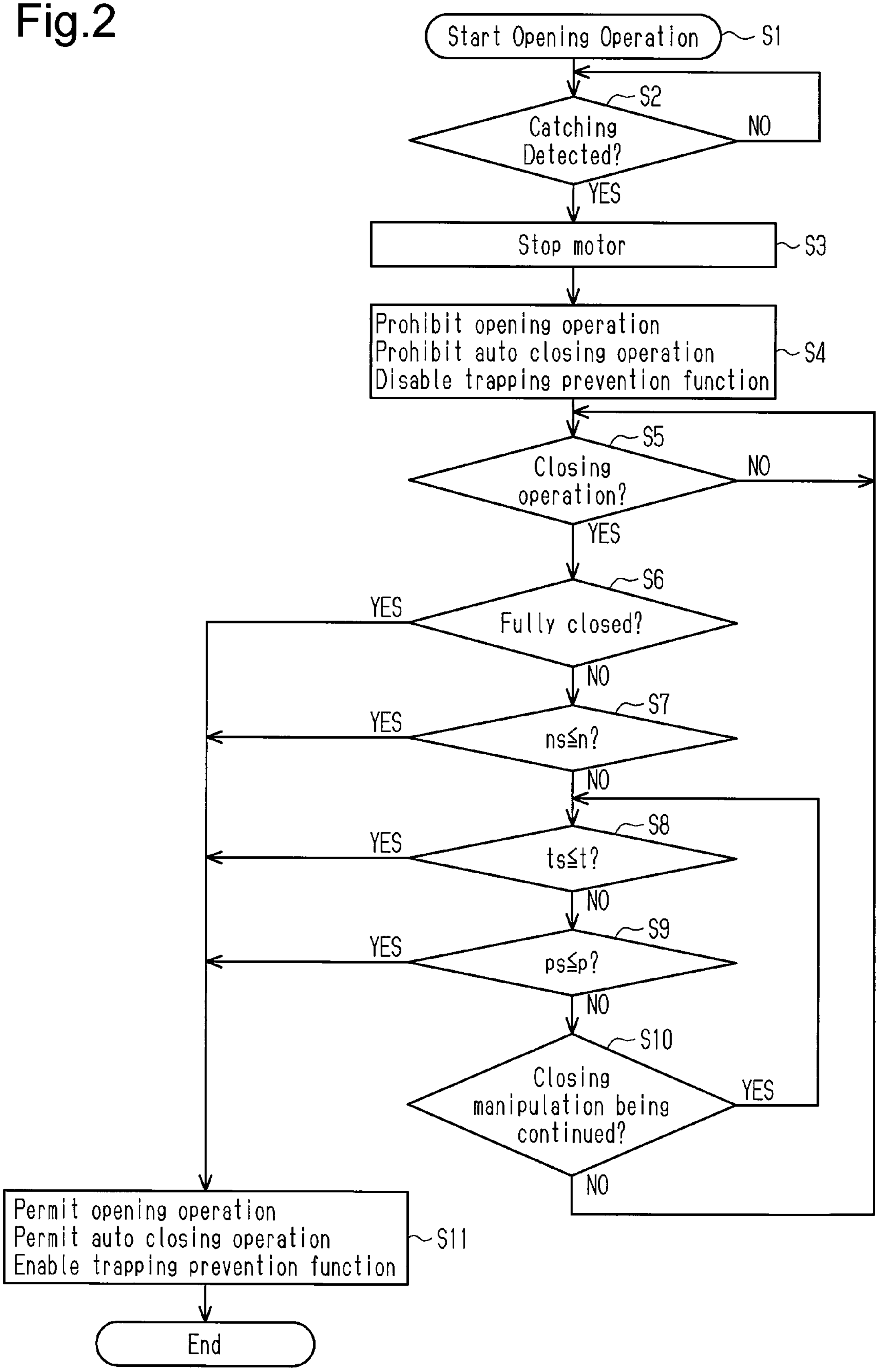
FIG. 2 is an explanatory flowchart showing a process for controlling the power window device of FIG. 1.

As shown in FIG. 2, when receiving the manual opening command signal or the auto opening command signal from the manipulation switch 31, the control circuit 21 supplies power to the motor 11 via the drive circuit 51 to cause the window glass pane WG to perform the opening operation (step S1).

At step S2, the control circuit 21 determines whether the window glass pane WG, which is in the opening operation, has caught a foreign object. At this time, the control circuit 21 compares the speed fluctuation of the motor 11 with the catching determination threshold value. If the speed fluctuation is less than the catching determination threshold value, the control circuit 21 determines that catching of a foreign object by the window glass pane WG is not occurring and repeats step S2. In contrast, if the speed fluctuation is greater than or equal to the catching determination threshold value, the control circuit 21 determines that the window glass pane WG has caught a foreign object and stops the motor 11, thereby stopping the opening operation of the window glass pane WG (step S3). At step S3, the control circuit 21 initializes (resets) the number of times n of the closing operation of the window glass pane WG, the operation time t of the closing operation, and the displacement p of the closing operation, which are stored in the memory (not shown).

Next, at step S4, the control circuit 21 prohibits the opening operation of the window glass pane WG as described above (shifts to the opening operation prohibiting mode). Accordingly, even if an occupant erroneously performs the opening manipulation of the manipulation switch 31, the window glass pane WG will not open.

Also, at step S4, the control circuit 21 disables the trapping prevention function as described above. After catching of a foreign object is detected, the window glass pane WG is caused to perform the closing operation to release the caught object. At this time, even if the fluctuation in the load due to the caught foreign object causes a characteristic value of the motor 11 to become greater than or equal to a catching determination value, the window glass pane WG will not be reversed (the window glass pane WG will not perform the opening operation). This allows the caught foreign matter to be easily released.

Also, at step S4, the control circuit 21 prohibits the auto closing operation of the window glass pane WG as described above. Accordingly, the auto closing operation of the window glass pane WG is prevented from being performed with the trapping prevention function disabled.

Thereafter, if the manipulation switch 31 is manipulated to close the window glass pane WG, the control circuit 21 causes the window glass pane WG to perform the closing operation, and proceeds to step S6. At this time, if the manipulation of the manipulation switch 31 is the auto closing manipulation (the manipulation to the second stage), the control circuit 21 causes the window glass pane WG to perform the manual closing operation. Also, at this time, the control circuit 21 increments the counter for the number of times of the closing operation (the number of times n of the closing operation) by one based on the closing manipulation of the manipulation switch 31, and causes a timer (not shown) to start measuring the operation time t.

At step S6, the control circuit 21 determines whether the window glass pane WG is at the fully closed position (or in the fully closed region). If the window glass pane WG is at the fully closed position (or in the fully closed region), the control circuit 21 permits the opening operation of the window glass pane WG, enables the trapping prevention function, and permits the auto closing operation (step S11). In contrast, if the window glass pane WG is at a position other than the fully closed position (or out of the fully closed region), the control circuit 21 proceeds to step S7.

At step S7, the control circuit 21 compares the number of times n of the closing operation (the counter of the number of times of the closing operation) with the predetermined threshold value ns. If the number of times n of the closing operation is greater than or equal to the threshold value ns, the control circuit 21 permits the opening operation of the window glass pane WG, enables the trapping prevention function, and permits the auto closing operation (step S11). In contrast, if the number of times n of the closing operation is less than the threshold value ns, the control circuit 21 proceeds to step S8.

At step S8, the control circuit 21 compares the operation time t of the closing operation with the predetermined threshold value ts. If the operation time t is greater than or equal to the threshold value ts, the control circuit 21 permits the opening operation of the window glass pane WG, enables the trapping prevention function, and permits the auto closing operation (step S11). In contrast, if the operation time t is less than the threshold value ts, the control circuit 21 proceeds to step S9.

At step S9, the control circuit 21 compares the displacement p in the closing direction from the stop position, at which the window glass pane WG was stopped at step S3, with the predetermined threshold value ps. If the displacement p is greater than or equal to the threshold value ts, the control circuit 21 permits the opening operation of the window glass pane WG, enables the trapping prevention function, and permits the auto closing operation (step S11).

In contrast, if the displacement p is less than the threshold value ps, the control circuit 21 proceeds to step S10.

At step S10, the control circuit 21 determines whether the closing manipulation of the manipulation switch 31 is being continued (whether the closing command signal is being input). If the closing manipulation is being continued, the control circuit 21 returns to step S8. In contrast, if it is determined that the manipulation switch 31 is released and no closing command signal is received, the control circuit 21 returns to step S5. When the closing manipulation of the manipulation switch 31 is cancelled, the control circuit 21 causes the timer to temporarily stop measuring the operation time t.

The present embodiment has the following advantages.

(1) When detecting catching of a foreign object by the window glass pane WG during the opening operation, the control circuit 21 stops the opening operation and prohibits the subsequent opening operation of the window glass pane WG (proceeds to the opening operation prohibiting mode). In this case, the window glass pane WG is not opened even if the occupant erroneously performs the opening manipulation of the manipulation switch 31 after catching of a foreign object by the window glass pane WG in the opening operation is detected and the opening operation of the window glass pane WG is stopped or after the window glass pane WG is reversed and moved by a predetermined distance. Since the window glass pane WG is prevented from being opened when catching a foreign object, the caught foreign object can be easily released.

(2) The control circuit 21 permits the opening operation of the window glass pane WG based on the number of times n of the closing operation, the operation time t of the closing operation, and the displacement p of the closing operation after detection of catching of a foreign object. Thus, after the closing operation of the window glass pane WG is performed to some extent to release the caught foreign object, the normal operation mode can be resumed to permit the opening operation of the window glass pane WG.

(3) When the window glass pane WG is at the fully closed position (or in the fully closed region), the control circuit 21 permits the opening operation of the window glass pane WG. This reduces unnecessary calculations.

A vehicle window opening device according to a second embodiment will now be described. Like or the same reference numerals are given to those components that are like or the same as the corresponding components of the first embodiment, and detailed explanations are omitted.

Figure 3:
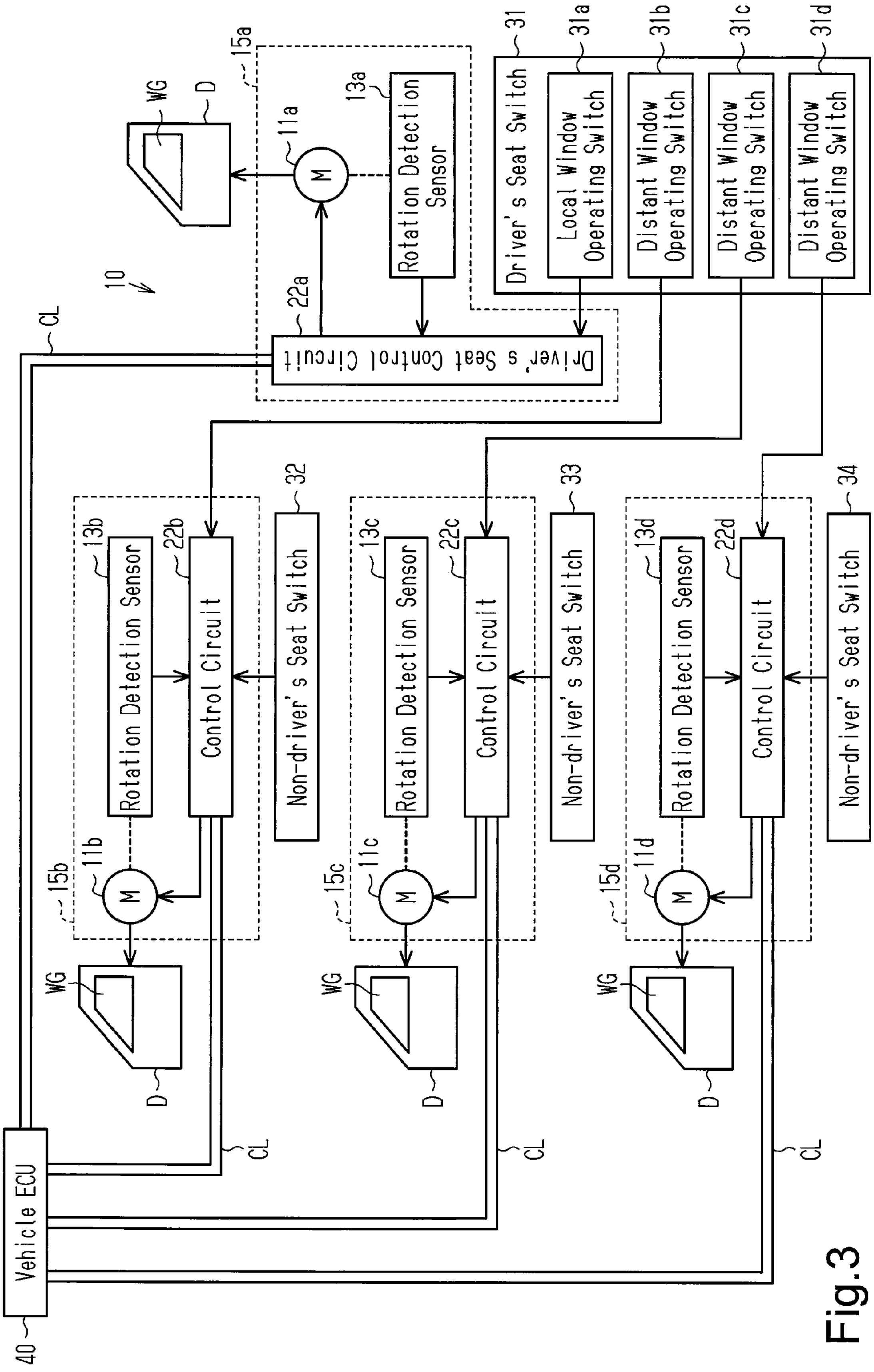
FIG. 3 is an electric block diagram schematically showing a power window device according to a second embodiment.

FIG. 3 shows vehicle windows in a vehicle, or window glass panes WG, which correspond to the seats and vehicle doors D of the vehicle.

As one example of a seat arrangement, a pair of seats is provided in each of the front part and the rear part of the vehicle. For each seat, a vehicle door D is located on the outer side, and the vehicle door D has a window glass pane WG for the seat. Hereinafter, one of the vehicle front seats will be referred to as a driver's seat, and the other is referred to as an auxiliary seat (front passenger seat). Also, one of the rear seats will be referred to as a left rear seat, and the other rear seat will be referred to as a right rear seat. The window glass pane WG that is closest to each seat will be referred to as the window glass pane WG for the seat. For example, as the window glass pane WG closest to the driver's seat will be referred to as the window glass pane WG for the driver's seat.

As shown in FIG. 3, a power window device 10, which is a vehicle window opening device, includes drive units 15*a*, 15*b*, 15*c*, 15*d*, which respectively correspond to the window glass panes WG.

The drive unit 15*a*, for example, corresponds to the driver's seat window glass pane WG and includes a motor 11*a* and a scissor-type window regulator (not shown), which is driven by rotation of the motor 11*a* to open and close the window glass pane WG. The drive unit 15*a* includes a driver's seat control circuit 22*a*, which controls the motor 11*a* to control operation of the window glass pane WG, and a rotation detection sensor 13*a*, which detects rotation of the motor 11*a*.

The drive unit 15*b*, for example, corresponds to the auxiliary seat window glass pane WG and includes a motor 11*b* and a scissor-type window regulator (not shown), which is driven by rotation of the motor 11*b* to open and close the window glass pane WG. The drive unit 15*b* includes a control circuit 22*b*, which controls the motor 11*b* to control operation of the window glass pane WG, and a rotation detection sensor 13*b*, which detects rotation of the motor 11*b*.

The drive unit 15*c*, for example, corresponds to the left rear seat window glass pane WG and includes a motor 11*c* and a scissor-type window regulator (not shown), which is driven by rotation of the motor 11*c* to open and close the window glass pane WG. The drive unit 15*c* includes a control circuit 22*c*, which controls the motor 11*c* to control operation of the window glass pane WG, and a rotation detection sensor 13*c*, which detects rotation of the motor 11*c*.

The drive unit 15*d*, for example, corresponds to the right rear seat window glass pane WG and includes a motor 11*d* and a scissor-type window regulator (not shown), which is driven by rotation of the motor 11*d* to open and close the window glass pane WG. The drive unit 15*d* includes a control circuit 22*d*, which controls the motor 11*d* to control operation of the window glass pane WG, and a rotation detection sensor 13*d*, which detects rotation of the motor 11*d*.

In the present embodiment, the motors 11*a* to 11*d* correspond to drive portions, the control circuits 22*a* to 22*d* correspond to controlling portions, change detecting portions, catching detecting portions, and manipulation position determining portions.

The window regulator of each of the drive units 15*a* to 15*d* converts rotation of the corresponding one of the motors 11*a* to 11*d* into an opening/closing operation of the window glass pane WG.

Each of the rotation detection sensors 13*a*, 13*b*, 13*c*, and 13*d* is constituted, for example, by a Hall effect IC, and detects changes in the magnetic field generated by rotation of a sensor magnet (not shown) attached to the rotary shaft of the corresponding one of the motors 11*a* to 11*d*, thereby detecting rotation information of the corresponding one of the motors 11*a* to 11*d*, such as the number of rotations and the rotational position.

Each of the control circuits 22*a* to 22*d* is either provided separately from the corresponding one of the motors 11*a* to 11*d* or incorporated in the corresponding one of the motors 11*a* to 11*d*.

The control circuits 22*a* to 22*d* are connected to the vehicle ECU 40 via communication lines CL. The vehicle ECU 40 supplies power of the battery (not shown) to various parts of the vehicle in accordance with the state of the engine switch (not shown). Using the power supplied from the vehicle ECU 40, the control circuits 22*a* to 22*d* drive the motors 11*a* to 11*d*.

Based on manipulation of manipulation switches 31, 32, 33, 34, which will be discussed below and function as manipulation portions provided in the vehicle doors D, the control circuits 22*a* to 22*d* cause the motors 11*a* to 11*d* to rotate, thereby opening or closing the window glass panes WG. Hereinafter, when any of the manipulation switches 31, 32, 33, 34 is manipulated to operate one of the window glass panes WG, the manipulation will be referred to as "manipulation from the local seat" if the manipulated one of the switches 31, 32, 33, 34 belongs to the seat immediately adjacent to the window glass pane-to-be-operated WG. The manipulation will be referred to as "manipulation from a distant seat" if the manipulation was performed at any other seat. Based on rotation detection signals (pulse signals) output by the rotation detection sensors 13*a* to 13*d*, the control circuits 22*a* to 22*d* calculate positional information of the window glass panes WG. In the present embodiment, with the fully closed position of each window glass pane WG defined as a reference (zero), the control circuits 22*a* to 22*d* each calculate, as the positional information of the window glass pane WG, the number of counts of pulse edges (rising edges and falling edges) in the rotation detection signal. The number of counts is increased or decreased in accordance with the opening/closing operation of the window glass pane WG (that is, forward/reverse rotation of each of the motors 11*a* to 11*d*).

Also, the control circuits 22*a* to 22*d* detect the rotational directions of the motors 11*a* to 11*d* based on the rotation detection signals. Further, based on the interval (cycle) of the pulses of the rotation detection signals, the control circuits 22*a* to 22*d* calculate the rotational speeds of the motors 11*a* to 11*d* and the fluctuation of the speeds of the motors 11*a* to 11*d* (speed fluctuations).

Like the control circuit 21 of the first embodiment, the control circuits 22*a* to 22*d* each have a function to prevent a foreign object from being trapped between the window glass pane WG and the frame of the vehicle door D. Like the control circuit 21 of the first embodiment, the control circuits 22*a* to 22*d* each have a function to detect catching of a foreign object in the vehicle door D during the opening operation (lowering operation).

The control circuits 22*a* to 22*d* are connected to manipulation switches 31, 32, 33, 34, respectively. The control circuits 22*a* to 22*d* receive various types of command signals from the manipulation switches 31, 32, 33, 34 to open (lower) or close (raise) the window glass pane-to-be-operated WG. The manipulation switches 31, 32, 33, 34 are manipulated to open or close the window glass panes WG in the range from the fully closed position to the fully open position.

The manipulation switches 31, 32, 33, 34 are each located close to a seat in the vehicle and manipulated by an occupant to open or close the closest window glass pane WG.

To distinguish the manipulation switch 31, which is located close to the driver's seat and the manipulation switches 32, 33, 34, each of which is located close to a seat other than the driver's seat (the auxiliary seat and the rear seats), the first manipulation switch will be referred to as the driver's seat switch 31, and the other manipulation switches will be referred to as non-driver's seat switches 32, 33, 34.

The driver's seat switch 31 includes a local window operating switch 31*a* and distant window operating switches 31*b*, 31*c*, and 31*d*. The local window operating switch 31*a* is manipulated to open or close the window glass pane WG at the driver's seat, that is, at the seat closest to the control circuit 22*a* and the driver's seat switch 31. The distant window operating switches 31*b*, 31*c*, 31*d* are each manipulated to open or close to a window glass pane WG distant from the control circuit 22*a* and the driver's seat switch 31.

The local window operating switch 31*a* and the distant window operating switches 31*b*, 31*c*, 31*d* in the driver's seat switch 31 are located at a position operable by the occupant seated in the driver's seat (driver), which is, for example, on the upholstery of the door D. When manipulated by the occupant, the local window operating switch 31*a* of the driver's seat switch 31 outputs a signal indicating the manipulation to the driver's seat control circuit 22*a*. When manipulated by the occupant, each of the distant window operating switches 31*b*, 31*c*, 31*d* outputs a signal indicating the manipulation to the corresponding one of the control circuits 22*b*, 22*c*, 22*d* that controls opening/closing operation of the window glass pane-to-be-operated WG.

The non-driver's seat switches 32, 33, 34 are each arranged at a position operable by an occupant seated in a seat other than the driver's seat (one of the auxiliary seat and the two rear seats), for example, on the upholstery of the corresponding vehicle door D. When manipulated by an occupant, each of the non-driver's seat switches 32, 33, and 34 outputs a signal indicating the manipulation to the corresponding one of the control circuits 22*b*, 22*c*, and 22*d*.

When the local window operating switch 31*a* is manipulated, the driver's seat control circuit 22*a* supplies power to the motor 11*a* in the same drive unit 15*a* to control the opening/closing operation of the window glass pane WG.

When any of the distant window operating switches 31*b*, 31*c*, 31*d* in the driver's seat switch 31 is manipulated, the driver's seat switch 31 outputs a signal based on the manipulation to the corresponding one of the control circuits 22*b*, 22*c*, 22*d* that controls the opening/closing operation of the window glass pane-to-be-operated WG. Based on the signal from the manipulated one of the distant window operating switches 31*b*, 31*c*, 31*d*, the corresponding one of the control circuits 22*b*, 22*c*, 22*d* controls the associated one of the motors 11*b*, 11*c*, 11*d*. However, when the control circuits 22*b*, 22*c*, 22*d* detect catching of a foreign object, the operating direction of the window glass pane WG is limited to the closing direction. That is, when the manipulation of the distant window operating switches 31*b*, 31*c*, 31*d* corresponds to the closing operation, the control circuits 22*b*, 22*c*, 22*d* drive the motors 11*b*, 11*c*, 11*d*. However, if the manipulation corresponds to the opening operation, the control circuits 22*b*, 22*c*, 22*d* stop the motors 11*b*, 11*c*, 11*d* (or maintain the stopped state of the motors 11*b*, 11*c*, 11*d*).

Further, based on manipulation of the non-driver's seat switches 32, 33, 34, the control circuits 22*b*, 22*c*, 22*d* control the motors 11*b*, 11*c*, 11*d*. At this time, even if the control circuits 22*b*, 22*c*, 22*d* detect catching of a foreign object, the operating direction of the window glass pane WG is not limited since the manipulation is manipulation from the local seat.

One example of operation of the power window device 10 will now be described.

When any of the manipulation switches 31 to 34 is manipulated by an occupant, the corresponding one of the control circuits 22*a* to 22*d* of the power window device 10 of the present embodiment supplies power to the corresponding one of the motors 11*a* to 11*d* based on the manipulation (opening or closing manipulation). The control circuits 22*a* to 22*d* are each configured to detect trapping of a foreign object by the window glass pane WG during the closing operation. Also, the control circuits 22*a* to 22*d* are each configured to detect catching of a foreign object into the vehicle door D by the window glass pane WG during the opening operation.

Figure 4:
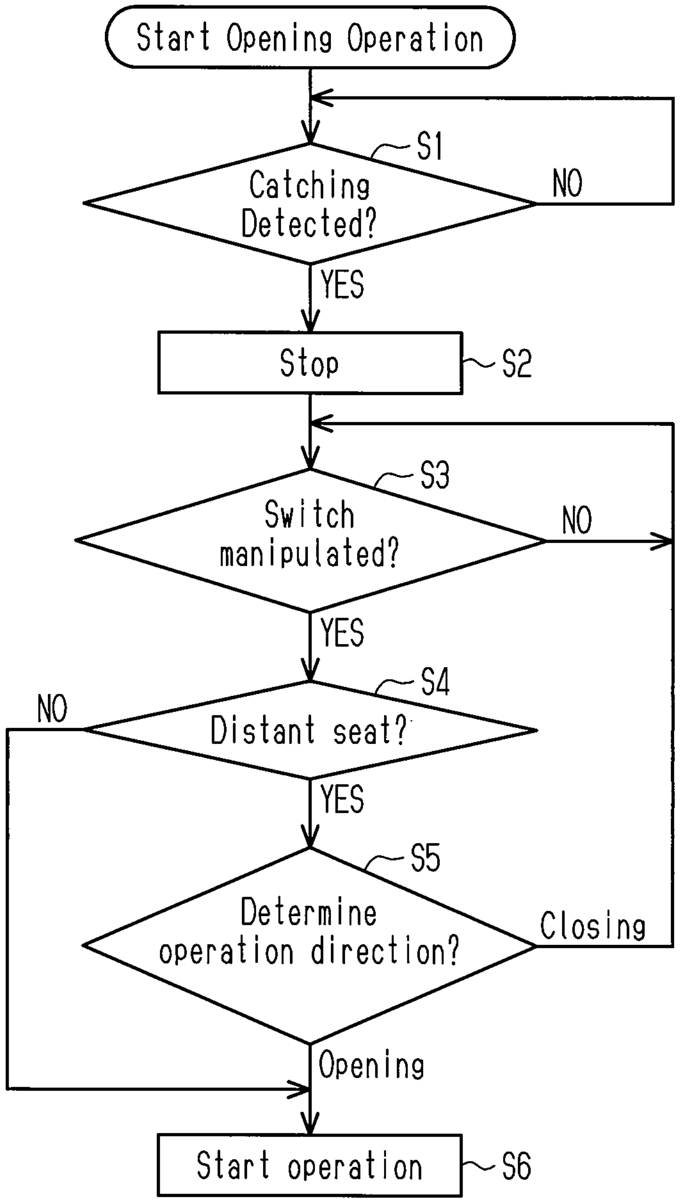
FIG. 4 is an explanatory flowchart showing a process for controlling the speed of the power window device of FIG. 3.

Hereinafter, control will be described with reference to FIG. 4, in which catching of a foreign object is detected during the opening operation of the window glass pane WG adjacent to a non-driver's seat. Although, from the drive units 15*b* to 15*d* in the non-driver's seats, the process related only to the drive unit 15*b* will be discussed below, the other drive units 15*c* and 15*d* perform substantially the same process.

The control circuit 22*b* of the drive unit 15*b* starts the opening operation of the window glass pane WG and detects catching of a foreign object by the window glass pane WG (step S1).

At this time, the control circuit 22*b* compares the speed fluctuation of the motor 11*b* with the catching determination threshold value (step S1). If the speed fluctuation is less than the catching determination threshold value, the control circuit 22*b* determines that catching of a foreign object by the window glass pane WG is not occurring (step S1: NO), and repeats step S1. If the speed fluctuation is greater than or equal to the catching determination threshold value, the control circuit 22*b* determines that the window glass pane WG has caught a foreign object (step S1: YES). The control circuit 22*b* then stops the motor 11*b*, thereby stopping the opening operation of the window glass pane WG (step S2).

Subsequently, the control circuit 22*b* checks whether the non-driver's seat switch 32 or the distant window operating switch 31*b* has been manipulated (step S3). If neither the non-driver's seat switch 32 nor the distant window operating switch 31*b* has been manipulated (step S3: NO), the control circuit 22*b* repeats step S3.

If the non-driver's seat switch 32 or the distant window operating switch 31*b* has been manipulated (step S3: YES), the control circuit 22*b* determines whether the manipulated switch is located at a seat distant from the window glass pane-to-be-operated WG (step S4).

At this time, if the switch that has been manipulated to operate the window glass pane-to-be-operated WG is the non-driver's seat switch 32, the control circuits 22*b* determines that the manipulation has been performed at the local seat (step S4: NO) and drives the motor 11*b* based on the manipulation of the non-driver's seat switch 32 to operate the window glass pane-to-be-operated WG (step S6).

In contrast, if the switch that has been manipulated to operate the window glass pane-to-be-operated WG is the distant window operating switch 31*b*, the control circuits 22*b* determines that the manipulation has been performed at a distant seat (step S4: YES) and determines the operating direction of the window glass pane WG based on the manipulation of the distant window operating switch 31*b* (step S5).

At step S5, if the operating direction of the window glass pane WG based on the manipulation of the distant window operating switch 31*b* is the opening direction (step S5: Opening), the control circuit 22*b* drives the motor 11*b* based on the opening manipulation of the distant window operating switch 31*b* and opens the window glass pane-to-be-operated WG (step S6).

At step S5, if the operating direction of the window glass pane WG based on the manipulation of the distant window operating switches 31*b* is the closing direction (step S5: Closing), the control circuit 22*b* returns to and repeats step S3. That is, the control circuit 22*b* maintains the stopped state of the motor 11*b* and does not cause the window glass pane WG to perform the closing operation.

The present embodiment has the following advantages.

(4) If the switch manipulated after catching of a foreign object is detected corresponds to a distant seat, the associated one of the control circuits 22*b*, 22*c*, 22*d* limits the operating direction of the window glass pane-to-be-operated WG to only the closing direction. This limits operation in the opening direction at a position that is hard to see from the position of the occupant who has manipulated the manipulation switch (at a distant seat). Thus, the caught foreign matter is prevented from being further deeply caught.

(5) If the switch manipulated after catching of a foreign object is detected corresponds to the local seat, the associated one of the control circuits 22*b*, 22*c*, 22*d* does not limit the operating direction of the window glass pane-to-be-operated WG. The operability at the local seat is thus not reduced.

The above described embodiments may be modified as follows.

In the first and second embodiments, the control circuits 21 and 22*a* to 22*d* detect a foreign object (trapping and catching of a foreign object) based on speed fluctuation. However, the present invention is not limited to this. For example, a foreign object may be detected based on a characteristic value other than speed fluctuation of the motors 11 and 21*a* to 21*d* (a characteristic value of the motors 11 and 21*a* to 21*d* that fluctuates in accordance with fluctuation of the load on the window glass pane WG).

In the first and second embodiments, the control circuits 21 and 22*a* to 22*d* reverse the window glass pane WG into the opening direction and move it by a predetermined distance based on determination of trapping of a foreign object. Instead, for example, the control circuits 21 and 22*a* to 22*d* may stop the motors 11 and 21*a* to 21*d* based on determination of trapping of a foreign object. In the first and second embodiments, the control circuits 21 and 22*a* to 22*d* stop the motors 11 and 21*a* to 21*d* based on determination of catching of a foreign object, thereby stopping the opening operation of the window glass pane WG. Instead, for example, the control circuit 21 may reverse the window glass pane WG and move it by a predetermined distance in the closing direction based on determination of catching of a foreign object.

In the first embodiment, after shifting to the opening operation prohibiting mode based on determination of catching of a foreign object, the control circuit 21 permits opening operation of the window glass pane WG based on the number of times n of the closing operation, the operation time t of the closing operation, and the displacement p of the closing operation of the window glass pane WG. However, the present invention is not limited to this. For example, the control circuit 21 may return to the normal operation mode based on at least one of the number of times n of the closing operation, the operation time t of the closing operation, and the displacement p of the closing operation of the window glass pane WG. For example, the control circuit 21 may return to the normal operation mode based on the operation time t of the closing operation and the displacement p of the closing operation, without taking into consideration the number of times n of the closing operation. The conditions for enablement of the trapping prevention function and permission of the auto closing operation may be modified in the same manner.

In the first embodiment, the operation time t of the closing operation is defined as accumulated operation time of the closing operation in the opening operation prohibiting mode. Instead, the operation time t of the closing operation may be defined as the duration of a single performance of the closing operation in the opening operation prohibiting mode.

When the closing manipulation of the manipulation switch 31 ends (when the manipulation switch 31 is released) with the operation time t being longer than or equal to the threshold value ts at step S8 in the above illustrated embodiments, the control circuit 21 may permit the opening operation of the window glass pane WG, enable the trapping prevention function, and permit the auto closing operation. Also, when the closing manipulation of the manipulation switch 31 ends with the displacement p of the closing operation being greater than or equal to the threshold value ps at step S9 in the above illustrated embodiments, the control circuit 21 may permit the opening operation of the window glass pane WG, enable the trapping prevention function, and permit the auto closing operation.

In the second embodiment, if the window glass pane-to-be-operated WG is manipulated using a manipulation switch at a distant seat (for example, any of the distant window operating switches 31*b*, 31*c*, 31*d*) after catching of a foreign object is detected, the operating direction of the window glass pane-to-be-operated WG is limited to the closing direction. The present invention is not limited to this. For example, when a local window operating switch (for example, any of the local window operating switch 31*a* and the non-driver's seat switches 32, 33, 34) is manipulated after catching of a foreign object is detected, the associated one of the control circuits 22*a*, 22*b*, 22*c*, 22*d* may regard the manipulation as manipulation at a distant seat and limit the operating direction of the window glass pane WG to the closing direction.

In the second embodiment, step S5 is performed after step S4. However, step S4 may be performed after step S5. That is, the operating direction may be determined first, and then it may be determined whether the manipulated switch corresponds to a distant seat (or the local seat).

In the second embodiment, whether the manipulated switch corresponds to a distant seat is determined at step S4. However, step S4 may be modified as long as it is determined whether the manipulated switch corresponds to a distant seat or the local seat at step S4.

In the second embodiment, the distant window operating switches 31*b*, 31*c*, 31*d* of the driver's seat switch 31 are connected to the control circuits 22*b*, 22*c*, 22*d*, respectively. The present invention is not limited to this. For example, the distant window operating switches 31*b*, 31*c*, 31*d* may be connected to the driver's seat control circuit 22*a*, and the driver's seat control circuit 22*a* may be connected to the control circuits 22*b*, 22*c*, 22*d*, so that the distant window operating switches 31*b*, 31*c*, 31*d* output signals via the driver's seat control circuit 22*a*. In this case, for example, communication may be conducted between the control circuits 22*b*, 22*c*, 22*d* and the driver's seat control circuit 22*a*. When detecting catching of a foreign object, the control circuits 22*b*, 22*c*, 22*d* output a signal indicating the catching to the driver's seat control circuit 22*a*, which, in turn, determines whether the signal has been delivered from a distant seat. When any of the distant window operating switches 31*b*, 31*c*, 31*d* is manipulated after catching of a foreign object is detected and the manipulation is intended to operate the window glass pane WG in the opening direction, the driver's seat control circuit 22*a* does not necessarily need to output a manipulation signal for opening operation to the control circuits 22*b*, 22*c*, 22*d*.

In the second embodiment, the driver's seat switch 31 is capable of operating the window glass panes WG in the vehicle. Instead, the window glass panes WG in the vehicle may be controllable from another seat such as the auxiliary seat. Also, the driver's seat switch 31 may be arranged between the driver's seat and the auxiliary seat (for example, in the center console box). In this case, if the driver's seat switch 31 can be manipulated from the auxiliary seat, the non-driver's seat switch may be omitted from the auxiliary seat side.

In the first and second embodiments, the present invention is applied to the power window device 10, which employs a scissor-type window regulator. However, the present invention may be applied to a power window device that employs a wire-type window regulator or a power window device that employs a single-arm type window regulator.

In the first and second embodiments, the present invention is applied to the power window device 10, which opens and closes the window glass panes WG in the vehicle doors D. However, the present invention may be applied to a sunroof device that opens and closes a roof glass pane in the roof of a vehicle.

The above illustrated embodiments and the modifications may be combined in any suitable manner.

The invention claimed is:

1. A vehicle window opening device for a plurality of vehicle windows comprising:
- a plurality of controllers;
- a plurality of motors; and
- a plurality of switches, wherein each of the plurality of windows is provided with one of the plurality of controllers, one of the plurality of motors, and one of the plurality of switches, each controller being programmed to:
- output a command signal in response to manipulation of the corresponding switch;
- control the corresponding motor based on the command signal, thereby controlling an opening operation and a closing operation of the corresponding vehicle window;
- detect catching of a foreign object by the corresponding vehicle window based on a characteristic value of the corresponding motor that fluctuates in accordance with fluctuation in load acting on the vehicle window during the opening operation;
- when the switch is manipulated, determine whether the manipulation was performed either at a local seat that is adjacent to the vehicle window-to-be-operated or at a distant seat other than the local seat;
- control the opening operation, the closing operation, or both the opening operation and the closing operation of the vehicle window based on manipulation of the switch after the detection of catching;
- when catching of a foreign object is detected, either stop the opening operation of the corresponding vehicle window or reverse a movement of the corresponding vehicle window and move the vehicle window by a predetermined distance; and
- limit an operation direction of the vehicle window-to-be-operated only to the closing direction if, after the detection of catching of a foreign object, it is determined that the manipulation was performed at a distant seat.

2. The vehicle window opening device according to claim 1, wherein each controller is further programmed to, when catching of a foreign object is detected,
- prohibit the opening operation of the corresponding vehicle window.

3. The vehicle window opening device according to claim 2, wherein each controller is further programmed to permit the opening operation of the corresponding vehicle window based on at least one of a number of times of the closing operation of the vehicle window, an operation time of the closing operation, and a displacement of the closing operation after the detection of catching of a foreign object.

4. The vehicle window opening device according to claim 1, wherein each controller is further programmed to:

detect changes of a state of operation of one of the vehicle windows; and detect catching of a foreign object by one of the vehicle windows based on the detected changes.

5. The vehicle window opening device according to claim 4, wherein each controller is further programmed to not limit the operation direction of the vehicle window-to-be-operated if, after the detection of catching of a foreign object, it is determined that the manipulation was performed at the local seat.

* * * * *